US012559001B2

(12) United States Patent
Zhang

(10) Patent No.: US 12,559,001 B2
(45) Date of Patent: Feb. 24, 2026

(54) SHOULDER STRAP WIDTH ADJUSTMENT MECHANISM AND CHILD SAFETY SEAT

(71) Applicant: BAMBINO PREZIOSO SWITZERLAND AG, Steinhausen (CH)

(72) Inventor: Daliang Zhang, Steinhausen (CH)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 220 days.

(21) Appl. No.: 18/250,132

(22) PCT Filed: Oct. 21, 2021

(86) PCT No.: PCT/IB2021/059704
§ 371 (c)(1),
(2) Date: Apr. 21, 2023

(87) PCT Pub. No.: WO2022/084902
PCT Pub. Date: Apr. 28, 2022

(65) Prior Publication Data
US 2023/0406169 A1 Dec. 21, 2023

(30) Foreign Application Priority Data
Oct. 22, 2020 (CN) .......................... 202011135896.6

(51) Int. Cl.
*B60N 2/28* (2006.01)
*B60R 22/18* (2006.01)
(52) U.S. Cl.
CPC ......... *B60N 2/2812* (2013.01); *B60N 2/2824* (2013.01); *B60N 2/2827* (2013.01); *B60N 2/2851* (2013.01); *B60R 2022/1831* (2013.01)

(58) Field of Classification Search
CPC .. B60N 2/2812; B60N 2/2818; B60N 2/2824; B60N 2/2827; B60N 2/2851; B60R 2022/1831
See application file for complete search history.

(56) References Cited

U.S. PATENT DOCUMENTS 4,093,274 A * 6/1978 Scholz .................. B60R 22/201
                                                    280/807
6,030,047 A * 2/2000 Kain ...................... B60N 2/286
                                                    297/484

(Continued)

FOREIGN PATENT DOCUMENTS

CN        101096189 A      1/2008
CN        105438031 A      3/2016

(Continued)

OTHER PUBLICATIONS

Australian Application No. 2021366447; Examination Report No. 1 dated Apr. 11, 2024; 3 pages.

(Continued)

*Primary Examiner* — Philip F Gabler
(74) *Attorney, Agent, or Firm* — CANTOR COLBURN LLP

(57) ABSTRACT

The disclosure provides a shoulder strap width adjustment mechanism (40) comprising: a rail device (44), arranged on a seat backrest (22), including a first rail (441) and a second rail (442) arranged on both sides of the seat backrest (22) and extending substantially in a longitudinal direction, and a lateral distance between the first rail (441) and the second rail (442) gradually changes in the longitudinal direction; and two shoulder strap fixing members (42), connected to a seat headrest (30) and positioned between the seat headrest (30) and the seat backrest (22), and being slidable respectively along the first rail (441) and the second rail (442) of the rail device (44). In the disclosure, the shoulder strap (Continued)

width can be adjusted synchronously during the process of adjusting the height of the headrest, so as to meet the requirements of children of different heights and different body types.

12 Claims, 7 Drawing Sheets

(56)                     References Cited

U.S. PATENT DOCUMENTS

| | | | |
|---|---|---|---|
| 6,045,184 A * | 4/2000 | Nakagawa | B60N 2/2821 |
| | | | 297/484 |
| 6,276,720 B1 * | 8/2001 | Saito | B60R 22/202 |
| | | | 280/801.2 |
| 6,491,348 B1 | 12/2002 | Kain | |
| 6,820,939 B1 * | 11/2004 | Chen | B60N 2/2821 |
| | | | 297/484 |
| 7,547,065 B2 * | 6/2009 | Barger | B60N 2/2812 |
| | | | 297/483 |
| 7,861,341 B2 * | 1/2011 | Ayette | A61G 1/044 |
| | | | 5/628 |
| 9,381,834 B2 * | 7/2016 | Hutchinson | B60N 2/2812 |
| 2002/0145318 A1 | 10/2002 | Asbach et al. | |
| 2016/0023579 A1 | 1/2016 | Balensiefer et al. | |

FOREIGN PATENT DOCUMENTS

| | | |
|---|---|---|
| CN | 205059329 U | 3/2016 |
| CN | 107791905 A | 3/2018 |
| CN | 105857131 B | 5/2018 |
| CN | 108116283 A | 6/2018 |
| CN | 210101399 U | 2/2020 |
| CN | 211641926 U | 10/2020 |
| DE | 102017119698 A1 | 3/2018 |
| DE | 102017119698 B4 | 9/2020 |
| EP | 0287259 A2 | 10/1988 |
| EP | 0930194 A1 | 7/1999 |
| EP | 1808331 A2 | 7/2007 |
| GB | 2555914 A | 5/2018 |
| JP | H11198694 A | 7/1999 |
| JP | 2005313888 A | 11/2005 |
| JP | 2007196995 A | 8/2007 |
| JP | 2012025288 A | 2/2012 |
| JP | 2013141834 A | 7/2013 |
| JP | 3201637 U | 11/2015 |
| WO | 2008031583 A2 | 3/2008 |
| WO | 2019070831 A1 | 4/2019 |

OTHER PUBLICATIONS

Chinese Application No. 202011135896.6; First Office Action dated May 20, 2024; 16 pages.
Japanese Application No. 2023-524511; Notice of Reasons for Refusal dated Apr. 8, 2024; 10 pages.
International Search Report and Written Opinion for International Application No. PCT/IB2021/059704; International Filing Date: Oct. 21, 2021; Date of Mailing: Jan. 28, 2022; 9 pages.
Taiwanese Application No. 11120608200; Taiwanese Office Action dated Jun. 24, 2022; 6 pages.
EP Communication Pursuant to Article 94(3) EPC; Application No. 21 802 002.2-1009; Date Mailed Feb. 24, 2025; pp. 1-7.
Japanese Application No. 2023-524511; Notice of Allowance dated Mar. 18, 2025; pp. 1-5.
KR Notice of Allowance w English Translation; App No. 10-2023-7013850; Date Mailed Aug. 27, 2025; pp. 1-5.

* cited by examiner

SHOULDER STRAP WIDTH ADJUSTMENT MECHANISM AND CHILD SAFETY SEAT

CROSS-REFERENCE TO RELATED APPLICATIONS

This application is a National Stage application of PCT/IB2021/059704, filed Oct. 21, 2021, which claims the benefit of Chinese Application No. 202011135896.6, filed Oct. 22, 2020, both of which are incorporated by reference in their entirety herein.

TECHNICAL FIELD

The disclosure relates to a shoulder strap width adjustment mechanism, and particularly to a child safety seat for a vehicle, the child safety seat includes a shoulder strap width adjustment mechanism.

BACKGROUND

Child safety seat is a device specially designed for children of different weights or different ages. A child would be restrained in the child safety seat during travelling, in case of a car collision or sudden deceleration, the impact on the child is reduced and the child's body movement is restricted, thereby reducing their injuries, and effectively improving the safety of the seated child.

At present, most of the child safety seats in the market have the function of adjusting the height of the headrest. For example, in a patent document CN211641926U, a headrest height adjustment mechanism is proposed, which includes: a backrest with a plurality of locking slots; a headrest assembly movably arranged on the backrest; and a locking bar arranged on the headrest assembly, the locking bar is movably arranged in the locking slots, and the locking bar is locked into different locking slots to adjust a height of the headrest assembly in respect to the backrest; an adjustment member arranged on the headrest assembly for the locking bar; and an elastic member arranged between the adjustment member and the headrest assembly.

For example, another patent document CN210101399U also discloses a headrest height adjustment device, which includes a headrest and a seat back, and also includes a pulling member, an adjustment member and a resetting member. One end of the pulling member is a pulling end, and the other end has a first inclined surface. The adjustment member has a second inclined surface and a first locating part. One end of the adjustment member away from the second inclined surface is rotatably connected to the headrest. A resetting member is connected between the adjustment member and the headrest. The second inclined surface abuts and cooperates with the first inclined surface. The seat back is provided with several second locating parts along a height direction, and the adjustment member has a fixed position. When the adjustment member is in the fixed position, the first locating part and the second locating part are snap-fitted, and the headrest and the seat back are fixed in respect to each other.

SUMMARY

An object of the disclosure is to provide a shoulder strap width adjustment mechanism and a child safety seat, wherein during the process of adjusting the height of the headrest, the shoulder strap width can be adjusted synchronously, so as to meet the requirements of children of different heights and different body types.

The disclosure provides a shoulder strap width adjustment mechanism comprising: a rail device, arranged on a seat backrest, including a first rail and a second rail arranged on both sides of the seat backrest and extending substantially in a longitudinal direction, and a lateral distance between the first rail and the second rail gradually changes in the longitudinal direction; and two shoulder strap fixing members, connected to a seat headrest and positioned between the seat headrest and the seat backrest, and being slidable respectively along the first rail and the second rail of the rail device.

The disclosure further provides a child safety seat for a vehicle. The child safety seat comprises: a base for connecting to a seat of the vehicle; a seat shell including a seat backrest and a seat bottom, the seat bottom is connected to the base, and the seat backrest is provided laterally with two shoulder strap holes through which the shoulder strap passes; a seat headrest being longitudinally and slidably connected to an upper part of the seat backrest for accommodating a child's head; and a shoulder strap width adjustment mechanism amounted on the seat backrest, for causing a lateral distance between the shoulder strap holes to change as the seat headrest slides on the seat backrest.

BRIEF DESCRIPTION OF THE DRAWINGS

Those skilled in the art will understand, the drawings are mainly used for illustrative purposes and are not intended to limit the scope of the subject matter of the disclosure described herein. The drawings are not necessarily drawn to scale. In some cases, various aspects of the subject matter of the disclosure herein may be exaggerated or enlarged in the drawings to facilitate understanding of different features. In the drawings, the same reference numerals generally refer to the same features (e.g., functionally similar and/or structurally similar elements).

DETAILED DESCRIPTION

The drawings and exemplary embodiments described below are not meant to limit the scope of these embodiments to a single embodiment. The embodiments can be realized by replacing part or all of the described or illustrated elements. In addition, in case that certain elements of the disclosed exemplary embodiment may be partially or wholly implemented using known components, in some cases, only the parts of such known components necessary for understanding this embodiment are described, and detailed descriptions of other parts of these known components are omitted so as not to obscure this embodiment.

Figure 1:
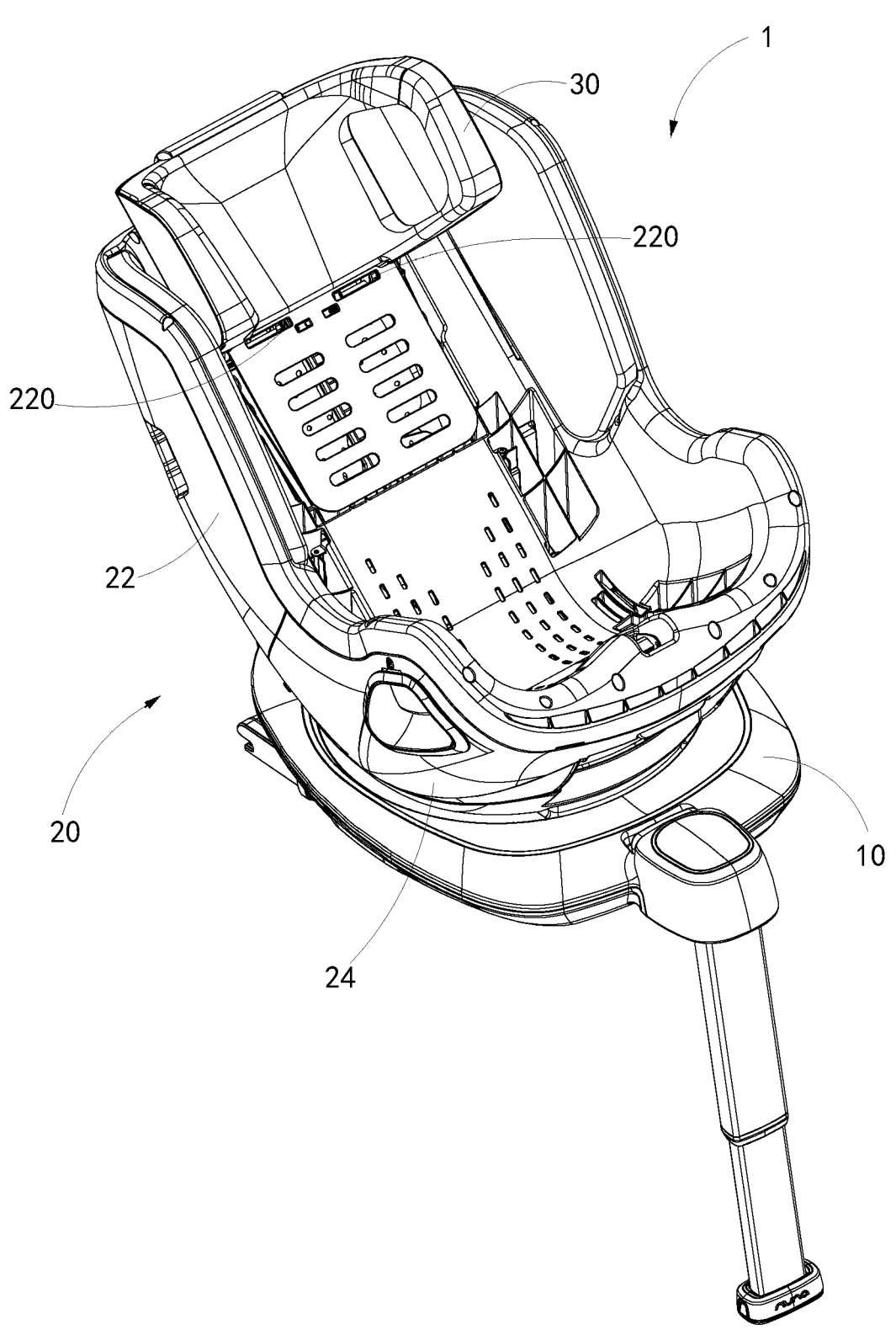
FIG. 1 is a schematic view of a child safety seat according to the disclosure.

As shown in FIG. 1 which is a schematic view of a child safety seat 1 according to the disclosure. The child safety seat 1 mainly includes a base 10, a seat shell 20, and a seat headrest 30. The base 10, for example, is connected and fixed to a car's seat, so as to fix the child safety seat 1. The seat shell 20 constitutes a main structure of the child safety seat 1, and includes a seat backrest 22 and a seat bottom 24. The seat backrest 22 and the seat bottom 24 together constitute a seating space for a child. The headrest 30 is connected to the seat backrest 22, such that the child using the child safety seat 1 rests his head on the headrest 30 to increase comfortability. Moreover, the headrest 30 is slidable longitudinally along the seat backrest 22, so as to adjust a longitudinal distance between the headrest 30 and the seat bottom 24, which may meet the requirements of children of different ages and different sizes, and increase their comfortability when seating in the child safety seat 1. In addition, in the child safety seat 1 of the embodiment, two shoulder strap holes 220 are further arranged on the left and right sides along the transverse direction of the seat backrest 22, and a safety belt of the child safety seat passes through the two shoulder strap holes 220, so as to restrain the child in the child safety seat 1. Preferably, the two shoulder strap holes 220 are symmetrically distributed in respect to a longitudinal center line of the seat backrest 22.

Figure 2:
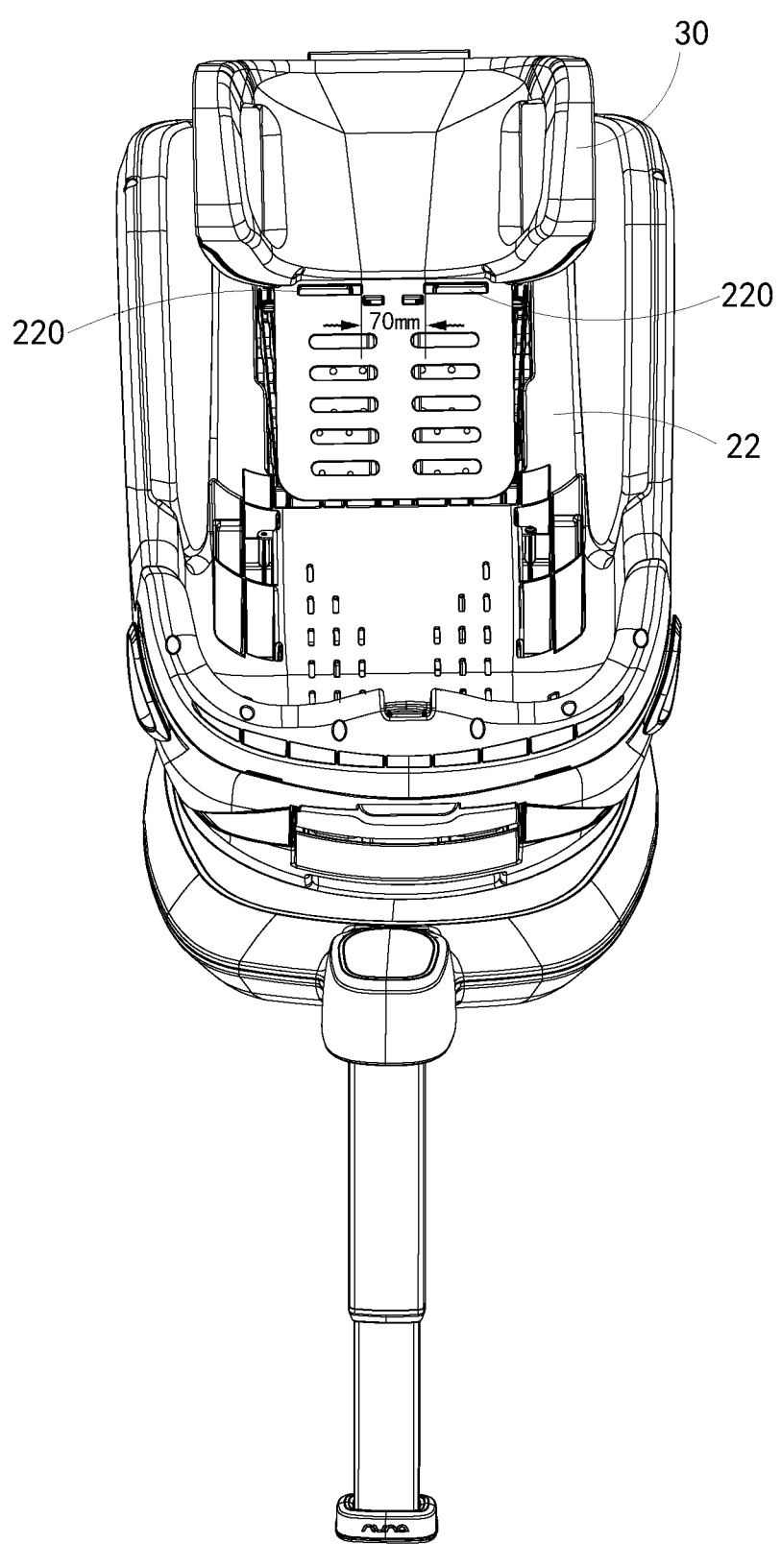
FIGS. 2 and 3 respectively show different shoulder strap widths when a headrest of a child safety seat is at different heights.
Figure 3:
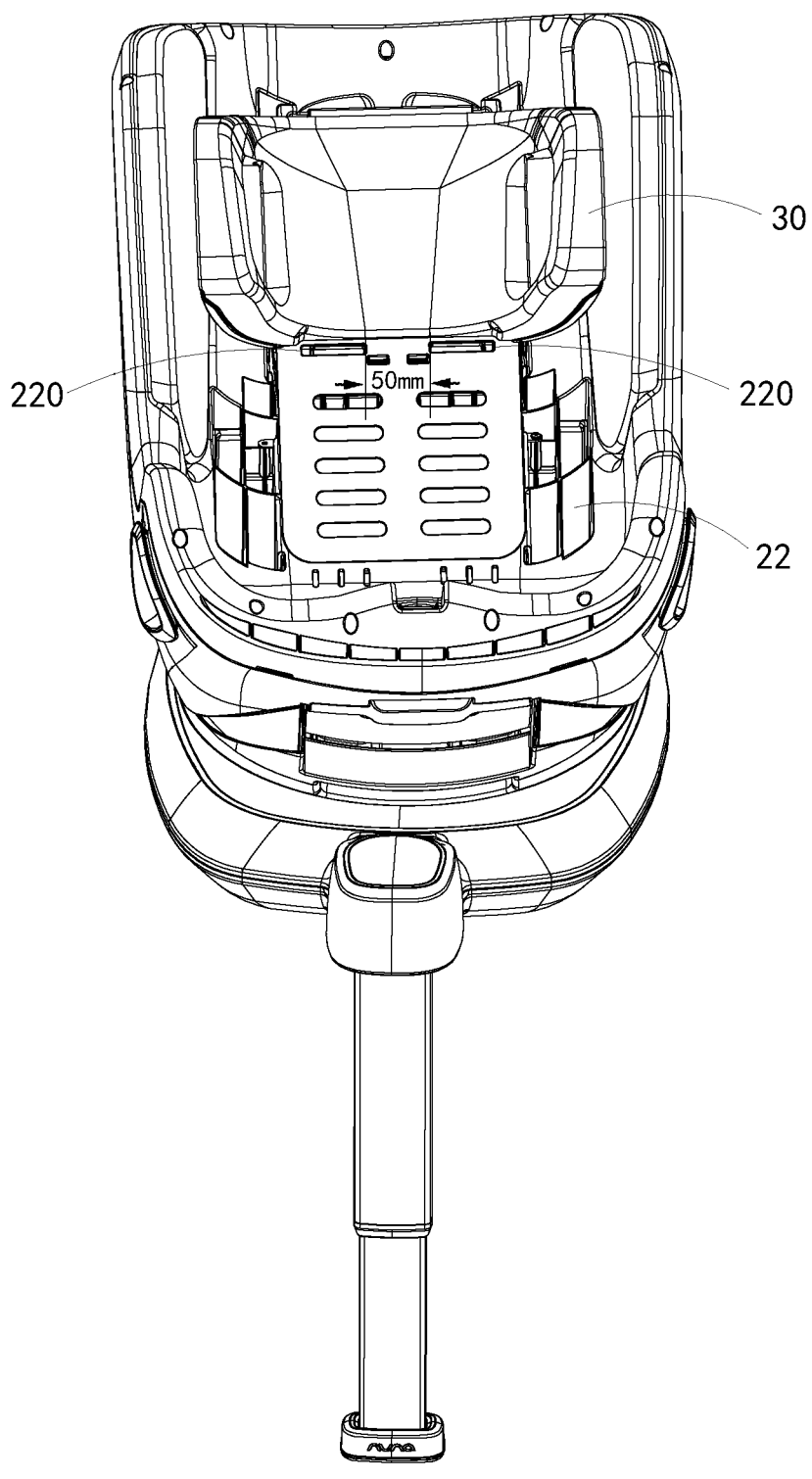

The child safety seat 1 of the disclosure also includes a shoulder strap width adjustment mechanism 40, in the process that the headrest 30 slides up and down along the seat backrest 22 in the longitudinal direction, a lateral distance between the shoulder strap holes 220 can be changed accordingly. For example, as shown in FIGS. 2 and 3 of the disclosure, when the headrest 30 is at an upper position in respect to the seat backrest 22 (shown in FIG. 2), the lateral distance between the shoulder strap holes 220 is, for example, 70 mm, and in FIG. 3, when the headrest 30 slides downward along the longitudinal direction of the seat backrest 22 to shorten a distance between the headrest 30 and the seat bottom 24, the lateral distance between the two shoulder strap holes 220 will be changed to, for example, 50 mm. In this way, for children of different ages and different body types, when the height of the headrest 30 is adjusted, the width of the shoulder strap width is also adjusted accordingly, thereby increasing the comfortability and safety in seating.

Figure 4:
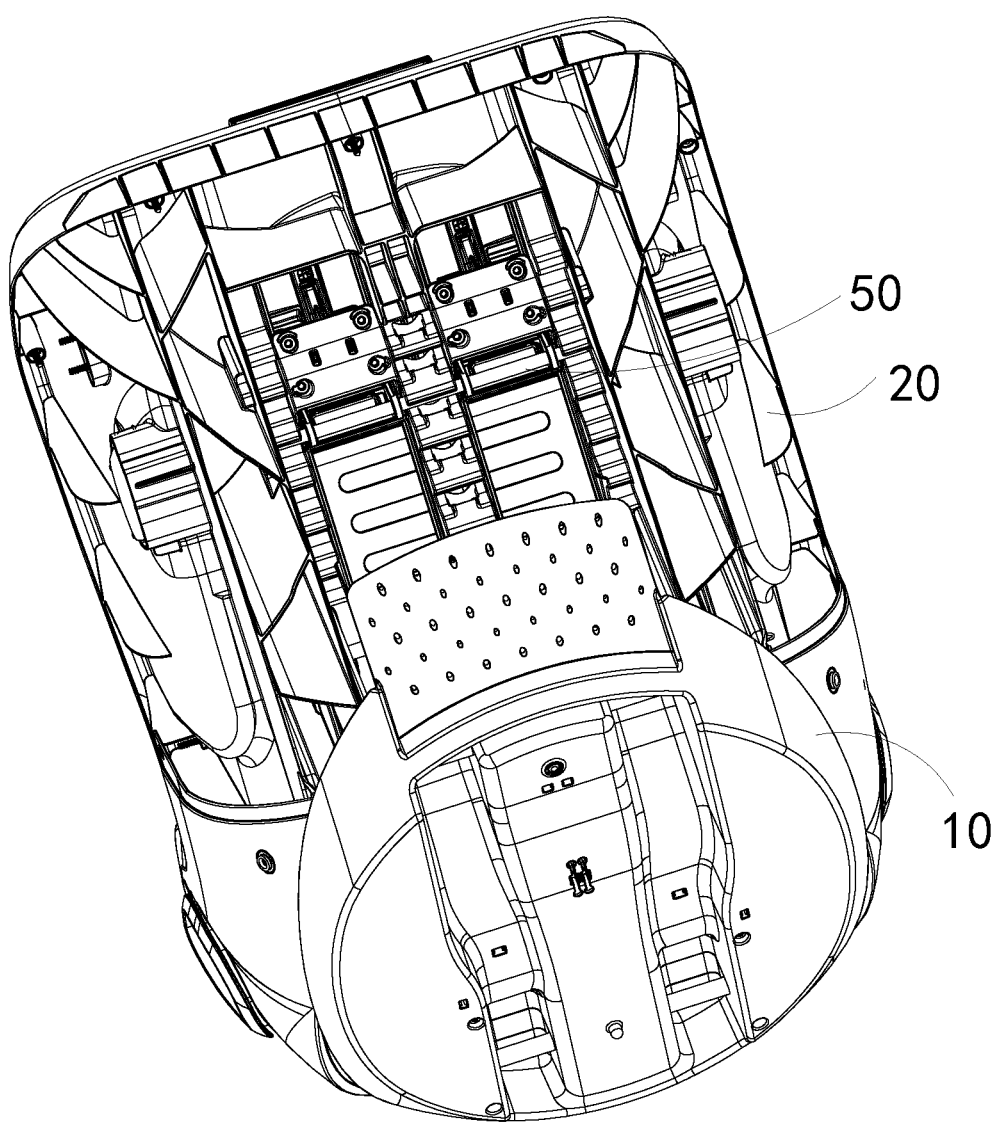
FIG. 4 is a partial schematic view of a child safety seat according to the disclosure.

The child safety seat 1 of the disclosure also includes a clamping bar 50. As shown in FIG. 4, the clamping bar 50 is used to locate the headrest 30 to the seat shell 20, i.e., when the headrest 30 slide to a proper position in the longitudinal direction, the headrest 30 is fixed on the seat shell 20 by the clamping bar 50.

Figure 5:
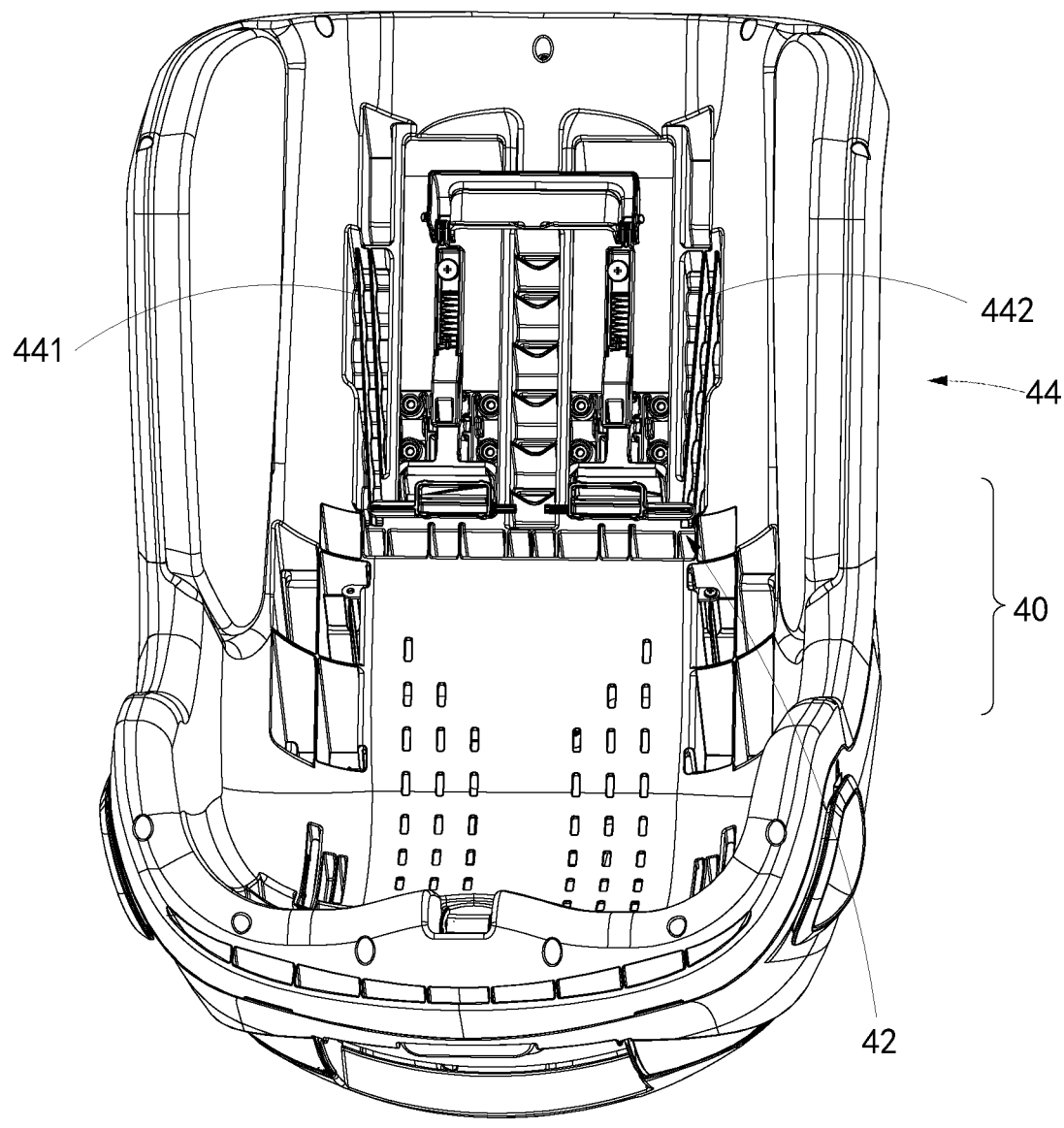
FIGS. 5 and 6 are respectively different structural schematic views of a shoulder strap width adjustment mechanism according to the disclosure.
Figure 6:
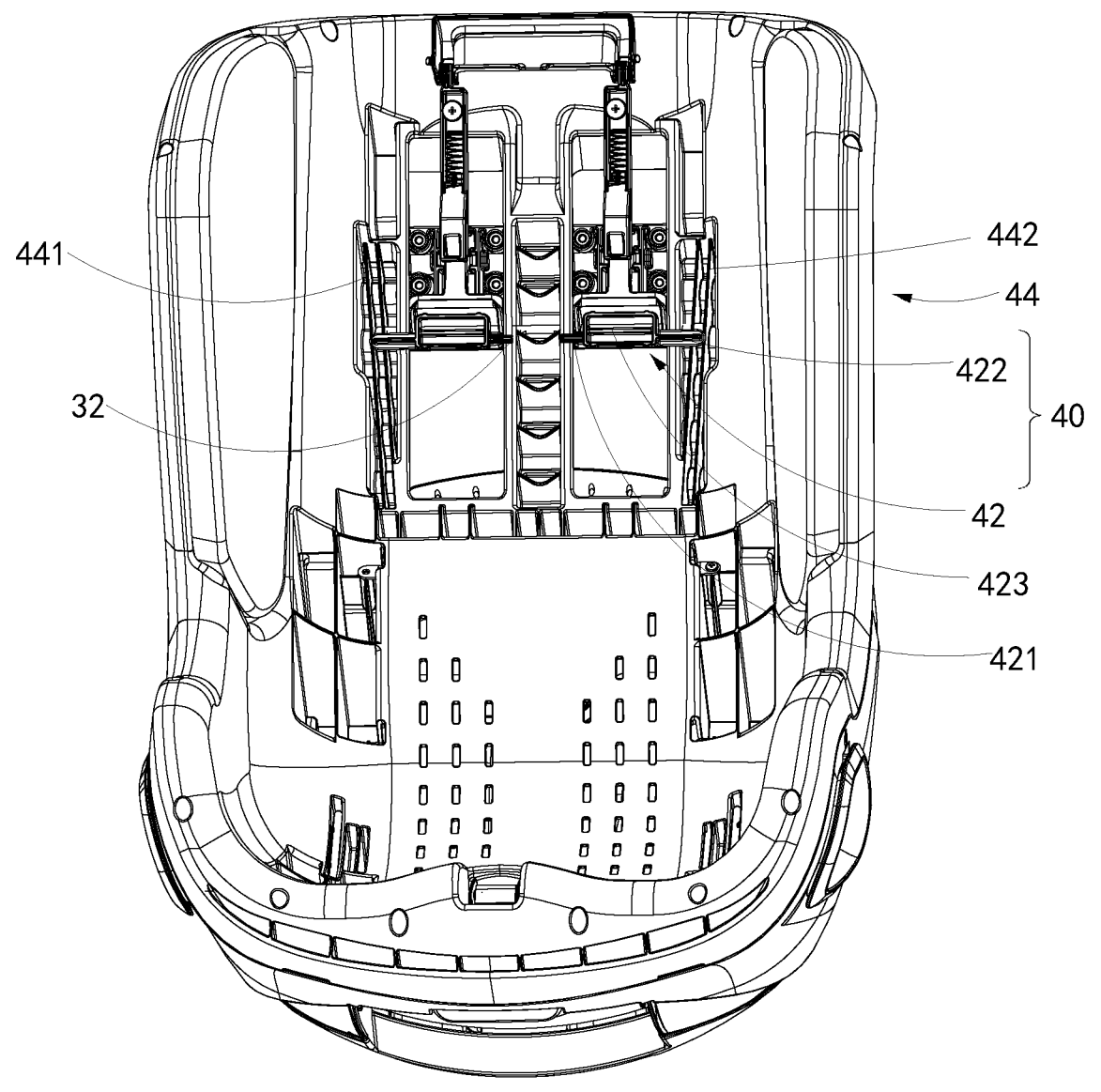
Figure 7:
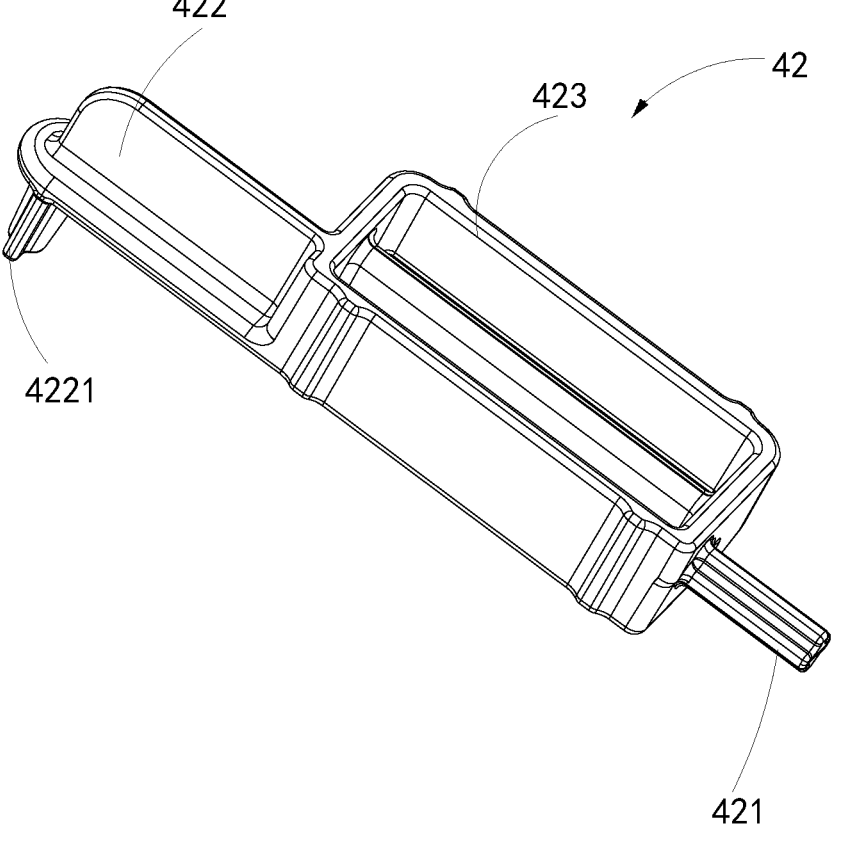
FIG. 7 is a schematic view of a shoulder strap fixing member according to the disclosure.

Now the specific structure of the shoulder strap width adjustment mechanism 40 according to the disclosure will be described in detail with reference to FIGS. 5-7, wherein FIGS. 5 and 6 are respectively different structural schematic views of the shoulder strap width adjustment mechanism according to the disclosure, and FIG. 7 is a schematic view of the shoulder strap fixing member according to the disclosure. The shoulder strap width adjustment mechanism 40 mainly includes a rail device 44 and two shoulder strap fixing members 42, and the rail device 44 further includes a first rail 441 and a second rail 442 respectively arranged on both sides of the seat backrest 22 in a lateral direction. Preferably, the first rail 441 and the second rail 442 are symmetrically distributed about the longitudinal center line of the seat backrest 22. Moreover, the lateral distance between the first rail 441 and the second rail 442 gradually increases in a direction away from the seat bottom 24.

An example of the specific structure of the shoulder strap fixing members 42 is shown in FIG. 7, and referring to FIGS. 6 and 7 at the same time, each of the shoulder strap fixing members 42 includes a first end 421 and a second end 422 opposite to each other, and a shoulder strap accommodating part 423 is positioned between the first end 421 and the second end 422. The shoulder strap of the child safety seat 1 is fixedly connected to the shoulder strap accommodating part 423. The first end 421 is laterally inserted into an aperture 32 of the headrest 30, and a length of the first end 421 inserted into the aperture 32 is changed as the shoulder strap fixing member 42 sliding up and down in the longitudinal direction. For example, in the process that the shoulder strap fixing member 42 slides away from the seat bottom 24 in the longitudinal direction, the length of the first end 421 inserted into the aperture 32 gradually reduces; on the contrary, in the process that the shoulder strap fixing member 42 slides close to the seat bottom 24 in the longitudinal direction, the length of the first end 421 inserted into the aperture 32 gradually increases. The second end 422 of the shoulder strap fixing member 42 is longitudinally slidably connected to corresponding rails. For example, in FIG. 6, the second end 422 of the shoulder strap fixing member 42 arranged on the left side of the seat backrest 22 is slidably arranged on the first rail 441, and the second end 422 of the shoulder strap fixing member 42 arranged on the right side of the seat backrest 22 is slidably arranged on the second rail 442. Furthermore, the two first ends 421 of two shoulder strap fixing members 42 on the left and right sides are inserted into the two apertures 32 of the headrest 30, so that in the process for the headrest 30 sliding up and down in the longitudinal direction, the shoulder strap fixing members 42 can slide with the headrest 30 because the first ends are inserted into the apertures 32 of the headrest 30; and the second ends 422 of the shoulder strap fixing members 42 slides along the first rail 441 and the second rail 442. Since the lateral distance between the first rail 441 and the second rail 442 gradually increases in the direction away from the seat bottom 24, the lateral distance between the two shoulder strap fixing members 42 also gradually increases in the direction away from the seat bottom 24, and gradually decreases in the direction close to the seat bottom 24.

As another embodiment of the shoulder strap fixing members 42, the shoulder strap fixing members 42 each has a retractable structure, such that, the lateral lengths of the shoulder strap fixing members 42 continuously increases in a process of sliding upward, and in a process of sliding downward, for example, the lateral lengths of the shoulder strap fixing members continuously reduce. For example, each of the shoulder strap fixing members 42 in this embodiment includes a shoulder strap accommodating part 423 for fixing the shoulder strap, and a first member and a second member telescopically connected to each other. The first member is laterally and slidably inserted into inserted into the corresponding aperture 32 of the seat headrest, the second member is longitudinally and slidably connected to a corresponding rail, and the shoulder strap accommodating part 423 is fixed on the second member. As a result, as the shoulder strap fixing members 42 slide up and down in the longitudinal direction, a relative telescopic movement is performed between the first members and the second members, so the lateral distance between the two shoulder strap fixing members 42 gradually changes with their movement in the longitudinal direction.

According to an embodiment of the disclosure, for example, both the first rail 441 and the second rail 442 are in the shape of a long groove, and each of the long groove-shaped rails has a constant cross-sectional shape. Accordingly, the second end 422 of each of the shoulder strap fixing members 42 is provided with a slider 4221, and the slider 4221 cooperates with the long groove for sliding.

According to another embodiment of the disclosure, for example, the first rail 441 and the second rail 442 each is in a shape of a rod, and each of the rails in a shape of a rod has a constant cross-sectional shape. Accordingly, each of the second ends 422 of the shoulder strap fixing members 42 includes a sliding groove part which cooperates with the rod to slide.

According to the shoulder strap width adjustment mechanism 40 and the child safety seat 1 including shoulder strap width adjustment mechanism 40 of the disclosure, the height of the headrest 30 is adjustable and at the same time the shoulder strap width is adjustable simultaneously, thereby satisfying the requirements for the shoulder strap width of the children of different ages and different body types, and greatly improving the comfortability and safety of the child safety seat 1.

According to the shoulder strap width adjustment mechanism and the child safety seat including the shoulder strap width adjustment mechanism of the disclosure, the shoulder strap width can be adjusted synchronously during the process of adjusting the height of the headrest, so as to meet the requirements of children of different heights and different body types.

In an embodiment, each of the shoulder strap fixing members includes: a first end, a second end, and a shoulder strap accommodating part positioned between the first end and the second end, the first end is laterally and slidably inserted into a corresponding aperture of the seat headrest, and the second end is longitudinally and slidably connected to a corresponding rail.

Each of the first rail and the second rail is in a shape of a long groove and has a constant cross-sectional shape; and the second end of each of the shoulder strap fixing members is provided with a slider, and the slider cooperates with the long groove.

Each of the first rail and the second rail is in a shape of a rod and has a constant cross-sectional shape; accordingly, the second end of each of the shoulder strap fixing members is provided with sliding groove part, and the sliding groove part cooperates with the rod.

Each of the shoulder strap fixing members includes: a shoulder strap accommodating part, and a first member and a second member telescopically connected to each other, the first member is laterally and slidably inserted into a corresponding aperture of the seat headrest, the second member is longitudinally and slidably connected to a corresponding rail, and the shoulder strap accommodating part is fixed on the second member.

In an embodiment, the first rail and the second rail are symmetrically arranged in respect to a longitudinal center line of the seat backrest.

In an embodiment, the lateral distance between the two shoulder strap holes increases as a distance between the seat headrest and the seat bottom increases, and decreases as the distance between the seat headrest and the seat bottom decreases.

The child safety seat of the disclosure further comprises a clamping bar for locating the seat headrest to the seat shell.

The description provided herein illustrates the various features by preferred and exemplary embodiments. Those ordinary skilled in the art can make many other embodiments, modifications and variations within the scope and spirit of the appended claims by reading this specification.

REFERENCE NUMERAL LIST

1: Child Safety Seat
10: Base

6

20: Seat Shell
  22 Seat Backrest 220 Shoulder Strap Hole
  24 Seat Bottom
30: Seat Headrest
  32 aperture
40: Shoulder Strap Width Adjustment Mechanism
  44 Rail Device
    441 First Rail 442 Second Rail
  42 Shoulder Strap Fixing Member
    421 First End 422 Second End 423 Shoulder Strap Accommodating Part
      4221 Slider
50: Clamping Bar

What is claimed is:

1. A shoulder strap width adjustment mechanism comprising:
   a rail device, arranged on a seat backrest, comprising a first rail and a second rail arranged on both sides of the seat backrest and extending substantially in a longitudinal direction, and a lateral distance between the first rail and the second rail being gradually changed in the longitudinal direction;
   two shoulder strap fixing members, connected to a seat headrest and positioned between the seat headrest and the seat backrest, and being slidable with the seat headrest respectively along the first rail and the second rail; and
   wherein each of the two shoulder strap fixing members has an opening for receiving a shoulder strap, and a lateral position of the opening of each of the two shoulder strap fixing members remains fixed relative to one of the first rail and the second rail of the rail device as the two shoulder strap fixing members slide respectively along the first rail and the second rail.

2. The shoulder strap width adjustment mechanism according to claim 1, wherein:
   each of the shoulder strap fixing members includes: a first end, a second end, and a shoulder strap accommodating part positioned between the first end and the second end, the first end is laterally and slidably inserted into a corresponding aperture of the seat headrest, and the second end is longitudinally and slidably connected to a corresponding rail.

3. The shoulder strap width adjustment mechanism according to claim 2, wherein:
   each of the first rail and the second rail is in a shape of a long groove and has a constant cross-sectional shape; and
   the second end of each of the shoulder strap fixing members comprises a slider, and the slider cooperates with the long groove.

4. The shoulder strap width adjustment mechanism according to claim 2, wherein:
   each of the first rail and the second rail is a rod and has a constant cross-sectional shape; and
   the second end of each of the shoulder strap fixing members comprises a slider, and the slider cooperates with the rod.

5. The shoulder strap width adjustment mechanism according to claim 1, wherein:
   the first rail and the second rail are symmetrically arranged in respect to a longitudinal center line of the seat backrest.

6. A child safety seat for a vehicle, wherein the child safety seat comprises:
   a base;

a seat shell comprising a seat backrest and a seat bottom, the seat bottom is connected to the base, and the seat backrest is provided laterally with two shoulder strap holes wherein each of the two shoulder strap holes receives a respective shoulder strap;

a seat headrest longitudinally and slidably connected to an upper part of the seat backrest; and a shoulder strap width adjustment mechanism mounted on the seat backrest and causing a lateral distance between the two shoulder strap holes to change as the seat headrest slides on the seat backrest.

7. The child safety seat according to claim 6, wherein the lateral distance between the two shoulder strap holes increases as a distance between the seat headrest and the seat bottom increases, and decreases as the distance between the seat headrest and the seat bottom decreases.

8. The child safety seat according to claim 7, further comprising:

a first rail and a second rail arranged at the seat backrest; and a pair of shoulder strap fixing members, each of the pair of shoulder strap fixing members including: a first end, a second end, and a shoulder strap accommodating part positioned between the first end and the second end, the first end is laterally and slidably inserted into a corresponding aperture of the seat headrest, and the second end is longitudinally and slidably connected to a corresponding rail.

9. The child safety seat according to claim 8, wherein:

each of the first rail and the second rail is in a shape of a long groove and has a constant cross-sectional shape; and the second end of each of the pair of shoulder strap fixing members comprises a slider, and the slider cooperates with the long groove.

10. The child safety seat according to claim 8, wherein:

each of the first rail and the second rail is a rod and has a constant cross-sectional shape; and the second end of each of the pair of shoulder strap fixing members comprises a slider, and the slider cooperates with the rod.

11. The child safety seat according to claim 10, wherein:

the first rail and the second rail are symmetrically arranged in respect to a longitudinal center line of the seat backrest.

12. The child safety seat according to claim 6, further comprising a clamping bar locating the seat headrest to the seat shell.

* * * * *